Dec. 1, 1964 A. G. BURNS 3,159,798

MICROWAVE MODULATOR

Filed Dec. 4, 1958

INVENTOR.
ARTHUR G. BURNS

BY H. S. Mackey

ATTORNEY.

United States Patent Office 3,159,798
Patented Dec. 1, 1964

3,159,798

MICROWAVE MODULATOR

Arthur G. Burns, Yorktown Heights, N.Y., assignor to General Precision, Inc., a corporation of Delaware Filed Dec. 4, 1958, Ser. No. 778,200
2 Claims. (Cl. 331—42)

This invention relates to modulators for use with carrier frequencies in the microwave region.

Transmission of microwave energy may be conveniently described in terms of the transmission of an electromagnetic field. The field may be transmitted in a selected direction by means of wires, strips, coaxial cables or pipes, one form of the latter being rectangular waveguide. As a convenience in description, microwave frequencies may be defined as those which may be carried by pipes, and submicrowave frequencies those which are better carried in wire circuits.

Amplitude modulation of a transmitted microwave field may be by microwave frequency energy, the difference frequency modulation product lying in the submicrowave frequency range. An example is found in the operation of the mixer of a radar receiver. Amplitude modulation of a transmitted microwave field may also be effected by submicrowave frequency energy, the sum and difference modulation products lying in the microwave frequency range. This is the case in which the present invention is useful.

As an example of use, a rectangular waveguide is provided with a modulating element inserted within the waveguide, the modulating element at the same time being a component of the generator of modulating energy. In the present instance the modulating element consists of a transistor. In its dual role it comprises the amplifier in an audio oscillator and at the same time provides the seat of interaction between the microwave field energy and the audio frequency energy.

It has been found highly advantageous to employ a transistor in this fashion because of the ease and high efficiency with which powerful modulating currents are obtained, resulting in strong modulation of the microwave field.

One purpose of this invention is to provide a device for the low-frequency modulation of microwave field energy.

Another purpose of the invention is to provide a device which is both a modulator and generator, for use in modulating a microwave field with energy at such low frequency that the sum and difference modulation products are at microwave frequencies.

A further understanding of this invention may be secured from the detailed description and drawings, in which.

Figures 1, 2, 4:
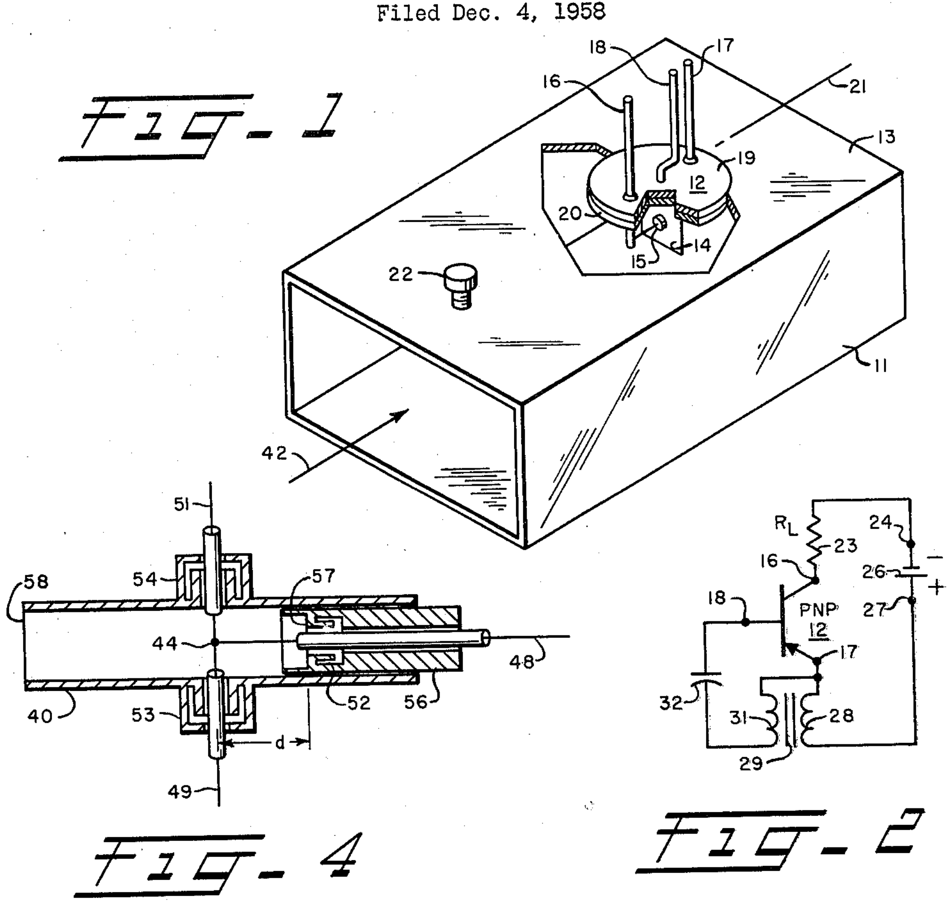
FIGURE 1 is an oblique view of a section of waveguide containing a transistor in accordance with the principles of the invention.
FIGURE 2 is the circuit of a transistor oscillator.
FIGURE 4 is a sectional view of another embodiment of the invention.

Referring now to FIG. 1, a rectangular waveguide section 11 is provided for transmission of microwave energy in the X band of frequencies. Its internal cross sectional dimensions are 0.4 inch and 0.9 inch. A transistor 12 is inserted through the broad face 13 of the microwave guide 11. This transistor is not encased in a metal shell but otherwise is the same as the PNP type 2N107 transistor, which is suitable for use as an audio amplifier or oscillator. The transistor base material is germanium, which is mounted on a base plate 14 made of metal. There are two diffused junctions on the germanium base, the collector junction being represented by the button 15 in the figure. This button is connected by a wire to a post, 16, forming the collector terminal. The emitter button is on the other side of the germanium semiconductor material and of its supporting plate and therefore is not visible in the figure. It is similarly connected by a wire to the emitter terminal post 17. A base terminal 18 is welded to the base plate 14 and also to the supporting metal disc 19. The collector and emitter posts 16 and 17 pass through disc 19 and are insulated from it by glass seals. The metal disc 19 is preferably insulated from the metal waveguide 11 by the insulating disc 20.

The transistor 12 is inserted in the waveguide broad face 13 so that the center of the transistor disc 19 lies on the median line 21 of the broad face 13. The transistor is oriented so that all three of its terminals 16, 17 and 18 lie on this median line 21. The collector is positioned on the side facing the direction from which microwave generated energy is applied. The transistor elements are inserted in the waveguide to intrude to such depth that the free end of the base plate 14 is approximately midway between the two broad faces of the waveguide. However, this positioning is not critical and very wide departures from the specified position make little difference in the output. A matching screw post 22 is provided in the median line of waveguide face 13 between the transistor and the source of microwave energy.

Although the described position and attitude of the transistor are optimum for the described transistor and in the described environment, they are not the only position and attitude which produce a detectable result. In fact, a wide variety of transistor positions and attitudes produce modulation in some degree.

The transistor 12 is connected as a part of the audio frequency oscillator circuit of FIG. 2. The collector terminal 16 is connected through a load resistor 23 having a resistance $R_L$ to the negative terminal 24 of a small battery 26 which may, for example, have a potential of 1.36 volts. The positive terminal 27 thereof is connected through one winding 28 of a transformer 29 to the emitter terminal 17. The other winding, 31, of transformer 29 is connected at one end to the emitter terminal 17, and at the other end through a capacitor 32 to the base terminal 18. The capacitor 32 has a value of .001 mfd and the transformer windings 31 and 28 have impedances of 3.4 and 4000 ohms respectively for the frequency range herein contemplated.

This circuit oscillates at about 1000 cycles per second when $R_L$ is between zero and 2000 ohms. The base is self-biased, internal conductance serving as leak. It is to be understood, however, that in this invention any other transistor oscillator circuit may be substituted for the one described, and that the modulating frequency generated may have any value capable of production by a transistor oscillating circuit, or by any other oscillating circuit containing a transistor.

Figure 3:
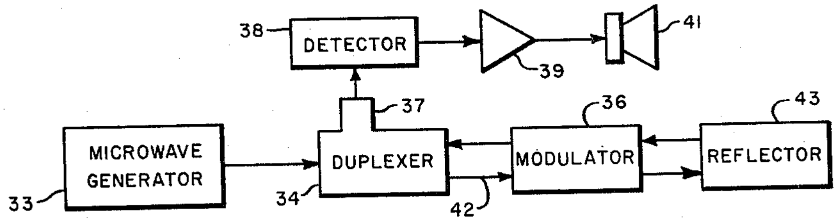
FIGURE 3 is a block diagram of apparatus embodying the invention.

One mode of use of the elements of the invention shown in FIGS. 1 and 2 is depicted in the block diagram of FIG. 3. A microwave generator 33 generates microwave energy which is applied to a duplexing component 34. This duplexing component may be of any type as, for example, that having a ferrite rotator so that generated energy passes to the modulator 36 while energy received from the modulator passes to the output arm 37. A detector 38, amplifier 39 and telephone receiver or speaker 41 are connected to the output arm 37.

The modulator 36 represents the waveguide section 11 of FIG. 1, the contained transistor and its oscillating circuit. The direction of application of microwave energy from the duplexer is shown by the arrow 42, FIGS. 1 and 3. The modulator 36 is followed by a non-absorbing reflector 43. This may consist, for example, of a metal plate blocking the waveguide at such distance from the transistor that maximum microwave potential is applied to the transistor. This distance is an odd integral multiple of one-quarter wavelength in guide.

In the operation of this modulatord, X-band microwave energy is generated by generator 33 and transmitted through duplexer 34 to the waveguide section 11 housing the modulator transistor. The capacitive screw post 22 is adjusted so as to neutralize substantially all of the impedance discontinuity caused by the metal posts and metal base plate of the transistor. The transistor circuit is placed in free oscillation, generating an alternating current which principally passes through the transistor 12 from emitter terminal 17 to collector terminal 16. As is well known, the resistance of a junction varies greatly with the current through it and also the potential across the junction varies in a corresponding way. Thus the transistor junction constitutes a varying impedance discontinuity and presents it to the impinging microwave energy, causing microwave reflection varying at the modulation rate. The microwave energy which is not reflected passes on to the reflector 43. This energy after impinging on the reflector 43 and being reflected therefrom, is reflected to augment the microwave field in phase at the transistor, and is there modulated.

All modulated microwave energy enters the duplexer 34 and passes out its side arm 37 to detector 38, where it is demodulated, eliminating the microwave frequency and leaving the 1000 cycle modulation envelope frequency. This is amplified in amplifier 39 and made audible at speaker 41.

Figure 5:
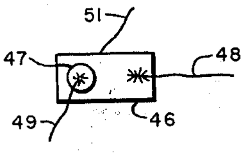
FIGURE 5 depicts a form of transistor which may be employed in the embodiment of FIGURE 4.

A second embodiment is shown in FIG. 4. It requires a special transistor design but greatly reduces the amount of metal and insulation inserted within the rectangular waveguide 40. The special transistor is very small and therefore depicted only by the dot 44. It consists of a diffused junction transistor element without base support, generally as shown in FIG. 5 to an enlarged scale. A germanium base strip 46 carries an indium button 47 for connection as emitter, and on the other side of the strip another indium button, not visible in the drawing, is provided for connection as collector. Fine wires 48, 49 and 51 are welded or soldered to the base and the two buttons to serve as base, emitter and collector terminals respectively. The dimensions of the transistor may be of the order of .02 inch wide, .02 inch thick and .05 inch long. Alternatively the base strip 46 may be composed of silicone and the buttons, such as button 47, pressed on each side of the base may consist of any of the elemental metals of valence 3, acceptor metals or valence 5 donor metals.

In FIG. 4 each of the terminal wires 48, 49 and 51 is insulated by a sleeve and carried outside the waveguide. These terminal wires are brought out through folded chokes 52, 53 and 54 which prevent microwave field leakage and reduce impedance at the inner end of the hole through which the terminal wire leaves the waveguide. The folded choke structures 53 and 54 are centered on the longitudinal centerlines of the broad faces of the waveguide 40 and the transistor 44 is positioned half way between the broad faces.

One end of the waveguide 40 is closed by a sliding metal plug 56 for reflecting the microwave energy so as to place a standing wave voltage maximum at the position of the transistor 44. The distance *d* from the closed end 57 of the plug to the transistor is therefore adjusted to be an odd multiple of a quarter wavelength of microwave energy within the waveguide.

The operation of this embodiment is similar to that described for the embodiment of FIG. 1 and illustrated in FIG. 3, but because of the reduction in metal placed within the waveguide there is less need for a matching screw post. The transistor 44 is placed in an oscillating circuit such as that shown in FIG. 2. The transistor 44 functions as the modulator 36, FIG. 3 and the shorting plug 56 functions as the reflector 43. The duplexer 34 is connected to the end 58 of the waveguide 40.

Although the transistor terminal wire 48 in FIG. 4 is described as the base terminal, and is so preferred, the modulator will operate with either the collector or emitter terminal brought out through the shorting plug instead of the base terminal.

What is claimed is:

1. A microwave modulator comprising, a transistor of the diffused alloyed type comprising a base of metal selected from the class consisting of silicon and germanium, said base being in the form of a sheet, a first wafer of elemental metal selected from the class consisting of valence 3 acceptor metals and valence 5 donor metals pressed onto one side of said base forming a collector, a second wafer of said selected elemental metal pressed onto the opposite side of said base forming an emitter, a length of rectangular waveguide, means positioning and supporting said transistor substantially at the center of the cross section of said length or rectangular waveguide, an oscillator circuit positioned externally of said waveguide and connected to said base, emitter and collector through conductors extending into but insulated from said waveguide, said oscillator circuit including a resonant capacitor-inductor circuit connected between said base and emitter terminals, and a coupler and direct-current source connected between said emitter and collector terminals whereby spontaneous oscillations occur by interaction among said oscillator components at a selected submicrowave frequency, a microwave generator having a frequency different from said selected frequency, waveguide means applying the output of said generator to one end of said length of rectangular waveguide whereby microwave field energy is set up therein, a short-circuiting plug in the other end of said length of rectangular waveguide, the distance between said transistor and said plug being an odd integral multiple of one-quarter of said microwave generator output wavelength in the waveguide, whereby said microwave generator output field energy is more strongly modulated at said selected frequency, and means isolating and receiving said modulated field energy.

2. A microwave modulator comprising, a transistor including at least collector, base and emitter, and having at least three terminals, a self-oscillatory modulating circuit including said three terminals and external components including a direct-current source and a resistor connected in an emitter-collector path, a capacitor connected in a second path including said base, and transformer means coupling said two paths, the frequency of spontaneous oscillation of said circuit being in the voice frequency range and determined solely by the magnitude of said external components, means generating microwave frequency energy in field form having a frequency different from said frequency of spontaneous oscillation, means causing said field energy to impinge on said transistor whereby the field energy is modulated at said voice frequency, and means receiving said modulated microwave frequency field energy after impingement.

References Cited in the file of this patent

UNITED STATES PATENTS

| | | |
|---|---|---|
| 2,460,109 | Southworth | Jan. 25, 1949 |
| 2,572,672 | Smith | Oct. 23, 1951 |
| 2,832,885 | Brett | Apr. 29, 1958 |
| 2,870,310 | van Overbeek | Jan. 20, 1959 |
| 2,914,665 | Linder | Nov. 24, 1959 |
| 2,926,312 | Brand et al. | Feb. 23, 1960 |
| 2,944,167 | Matare | July 5, 1960 |
| 2,967,279 | Beck | Jan. 3, 1961 |
| 2,978,652 | Thomas | Apr. 4, 1961 |